(12) United States Patent
Lim et al.

(10) Patent No.: US 6,522,622 B1
(45) Date of Patent: Feb. 18, 2003

(54) DISC CARTRIDGE AND METHOD AND DISC DRIVING APPARATUS EMPLOYING THE SAME WITH FUNCTIONAL HOLE ADJUSTMENT MECHANISM

(75) Inventors: Jong Rak Lim, Kyunggi-do (KR); Won Hyoung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/357,968

(22) Filed: Jul. 21, 1999

(30) Foreign Application Priority Data

Jul. 22, 1998 (KR) ............................................. 98-29564
Jul. 23, 1998 (KR) ............................................. 98-29595

(51) Int. Cl.[7] ................................................. G11B 3/70
(52) U.S. Cl. ..................................................... 369/291
(58) Field of Search ........................... 369/291; 360/133

(56) References Cited

U.S. PATENT DOCUMENTS 5,715,233 A * 2/1998 Yoshida et al. ............. 360/133
6,002,557 A * 12/1999 Tanaka ....................... 360/133

FOREIGN PATENT DOCUMENTS

JP          9282832          10/1997

* cited by examiner

Primary Examiner—George J. Letscher
(74) Attorney, Agent, or Firm—Birch, Stewart, Kolasch & Birch, LLP

(57) ABSTRACT

A disc cartridge that can simultaneously adjust a plurality of functional holes indicating whether or not the disc cartridge for receiving a double-sided disc has an opened or closed experience, and a disc driving apparatus for sensing the open and close state of the functional holes. In the disc cartridge, a body is provided with at least one of opened or closed experience confirming hole indicating whether or not the cartridge has an opened or closed experience. An opening and closing member allows a confirmation of an opened or closed state with respect to each face of the disc by an opening or closing of any one of the opened or closed experience confirming holes. Accordingly, the opened or closed state of the plurality of opened or closed experience confirming holes corresponding to the double-sided disc can be simultaneously adjusted, so that a user's convenience can be improved.

16 Claims, 9 Drawing Sheets

DISC CARTRIDGE AND METHOD AND DISC DRIVING APPARATUS EMPLOYING THE SAME WITH FUNCTIONAL HOLE ADJUSTMENT MECHANISM

BACKGROUND OF THE INVENTION

1. Field of the Invention

This invention relates to a disc cartridge, and more particularly to a disc cartridge that is capable of simultaneously adjusting a plurality of functional holes indicating whether or not a disc cartridge receiving a double-sided disc has an opened or closed experience. Also, the present invention relates to a disc driving apparatus that is capable of sensing an opened or closed state of the functional holes.

2. Description of the Related Art

Generally, a disc is classified into a read-only type disc such as CD-ROM and DVD-ROM, etc., a WROM(write once read many) type disc such as CD-R and DVD-R, etc., and a rewritable disc such as CD-RW, DVD-RAM and optical magnetic disc, etc. The read-only type disc in such discs has been usually propagated in a shape of bare disc. On the other hand, the rewritable disc has been received within the cartridge for the purpose of protecting an information recording face from a contamination or an impact to the exterior thereof. This is caused by a fact that the information recording face of the rewritable disc is liable to be contaminated and damaged easily because it is sensitive to fingerprint, dust, scratch and so forth. When an information is recorded or reproduced to or from a disc received within such a disc cartridge, a disc driver moves a shutter provided in the cartridge to expose a portion of the disc through an opened opening.

Nowadays, there has been suggested an open-close structure by which a disc can be taken out from the exterior at a user's request. Accordingly, the disc cartridge is classified into a sealed type and an open-close type depending on whether it can be opened and closed. The open-close type cartridge has such a structure that a user can easily insert or release a disc. In this case, a defect area caused by external contamination and impact occurs at the information recording face of the disc when a disc has been released from the cartridge into the exterior, so that an error can be generated at the time of recording or reproducing an information. In order to prevent this error, there has been appeared a necessity for confirming a release experience of the disc, that is, an opened or closed experience of the cartridge at the time of recording or reproducing an information to or from a disc received within the open-close type cartridge to precede a verifying operation for the sake of an assurance of information responsibility when the cartridge has an opened or closed experience. Accordingly, the disc cartridge is provided with a hole for confirming a release experience of the disc, that is, an opened or closed experience of the cartridge.

To the disc driver, there is installed a sensor for sensing an opened or closed experience of the cartridge depending on whether the opened or closed experience confirming hole provided in the cartridge is opened or closed. Accordingly, when a disc cartridge is loaded, the disc driver senses by means of the sensor whether the confirming hole provided in the disc cartridge is opened or closed. At this time, when the sensor has sensed an opening of the confirming hole, the disc driver recognizes that the disc has at least one release experience into the exterior to precede a verifying operation for the disc.

An open-close type cartridge including a cartridge body and a member for opening or closing is disclosed in Japanese Patent Laid-open Gazette No. Pyung 9-282832. However, the open-close type cartridge has a problem in that, since it is provided with a single opened or closed experience confirming hole, it is applicable to a single-sided disc having a single recording layer, but it can not be applied to a double-sided disc having two recording layers. In order to solve this problem, there has appeared a cartridge having opened or closed experience confirming holes formed in each side thereof such that it can be applied to the double-sided disc.

Referring to FIG. 1, there is shown an open-close type disc cartridge received with a double-sided disc. The open-close type disc cartridge includes a cartridge body 2 within which a disc 1 is received, and a holder 6 mounted to the cartridge body 2 insertably and releasably. The cartridge body 2 is provided with an opening such that an optical pickup can access the disc 1. The opening is opened or closed by a movement of a shutter 4. At the bottom of the cartridge body 2 is defined an inserting hole for inserting the disc 1, and the holder is mounted in opposition to the inserting hole. The cartridge body 2 is provided with a number of sensor holes, for example, sensor holes for allowing a disc driver to sense whether or not a recording of the received disc 1 is prohibited and opened and closed experience confirming holes 3A and 3B for judging a verification of the disc 1. The number of sensor holes including the opened or closed experience confirming holes 3A and 3B are usually located at the right/left lower end of the cartridge body 2. Tapping holes 7A and 7B are formed at the holder 8 in correspondence with the opened or closed experience confirming holes 3A and 3B. In the disc driver, a sensor (e.g., a switch) for sensing whether the sensor holes are opened or closed at a position where a loading of the cartridge has been completed, is installed at a position opposed to the sensor holes. In particular, when the received disc 1 is a double-sided disc, the sensor holes are defined at the each side of the cartridge body 2. The purpose of this is to permit the switch in the disc driver to sense the sensor holes even when the cartridge received with the double-sided disc such as DVD-RAM, etc. is loaded with the wrong side out. Each of the opened or closed experience confirming holes 3A and 3B in such sensor holes keep a shut state by a tab(not shown) for confining the holder 6 to the cartridge body when the disc 1 has no release experience from the cartridge body. In this case, if a user want to take out the disc 1 received within the cartridge, he must release the holder 6 from the cartridge body 2 after separating all the two tab having shut the opened or closed experience confirming holes 3A and 3B. Since the tabs have been removed when the disc has a released experience from the exterior, that is, when the cartridge has an opened or closed experience as described above, the opened or closed experience confirming holes 3A and 3B and tapping holes 7A and 7B maintain an open state. When a cartridge having an opened or closed experience is loaded into the disc driver, the disc driver senses an opening of the opened or closed experience confirming holes 3A and 3B by means of the switch to regard it as a contamination or a damage of the disc 1, thereby performing a recording operation after preceding a verifying operation of the disc 1.

However, each of the opened or closed experience confirming holes 3A and 3B are independently formed at the conventional open-close type cartridge applied to the double-sided disc. This causes an inconvenience in that each of the two tabs shutting the opened or closed experience confirming holes 34A and 34B is removed so that a user can take out the disc 1 from the cartridge. In order to overcome this convenience, two switches may be installed at the disc driver such that the respective opened or closed experience confirming holes 3A and 3B assigned to each recording face can be sensed. However, this causes a rise in a cost of the disc driver.

SUMMARY OF THE INVENTION

Accordingly, it is an object of the present invention to provide a disc cartridge wherein opened or closed confirming holes are linked such that they are simultaneously opened upon opening of a cartridge for a double-sided disc.

Further object of the present invention is to provide a disc cartridge that is capable of improving a user's convenience upon opening of a cartridge.

Still further object of the present invention is to provide a disc driving apparatus that is capable of sensing whether the opened or closed experience confirming holes are opened or closed.

In order to achieve these and other objects of the invention, a disc cartridge according to one aspect of the present invention includes a body in which at least one of opened or closed experience confirming holes for indicating whether or not the cartridge has an opened or closed experience is formed; and opening and closing means for allowing a confirmation of an opened or closed state with respect to each side of the disc only by an opening or closing of any one of the opened or closed confirming holes.

A disc driving apparatus according to another aspect of the present invention includes a tray loaded with a disc cartridge; and sensing means, being installed to the center thereof in correspondence with the positions of the opened or closed experience confirming holes, for sensing whether the opened or closed experience confirming hole has been opened or closed.

A disc cartridge according to still another aspect of the present invention includes a body in which a plurality of opened or closed experience confirming holes for indicating whether or not the cartridge has an opened or closed experience is formed; and a sliding member, being provided with a plurality of holes having a predetermined phase difference with respect to the opened or closed experience confirming holes, for opening or closing the opened or closed experience confirming holes simultaneously.

A disc cartridge according to still another aspect of the present invention includes a cartridge body in which a receiver for receiving the disc is provided and a plurality of opened or closed experience confirming holes for indicating whether or not the cartridge has an opened or closed experience are oppositely formed at the longitudinal center thereof toward the receiver; and an opening and closing member, being provided with holes opposed to the opened or closed experience confirming holes, for opening or closing the receiver.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Figure 2:
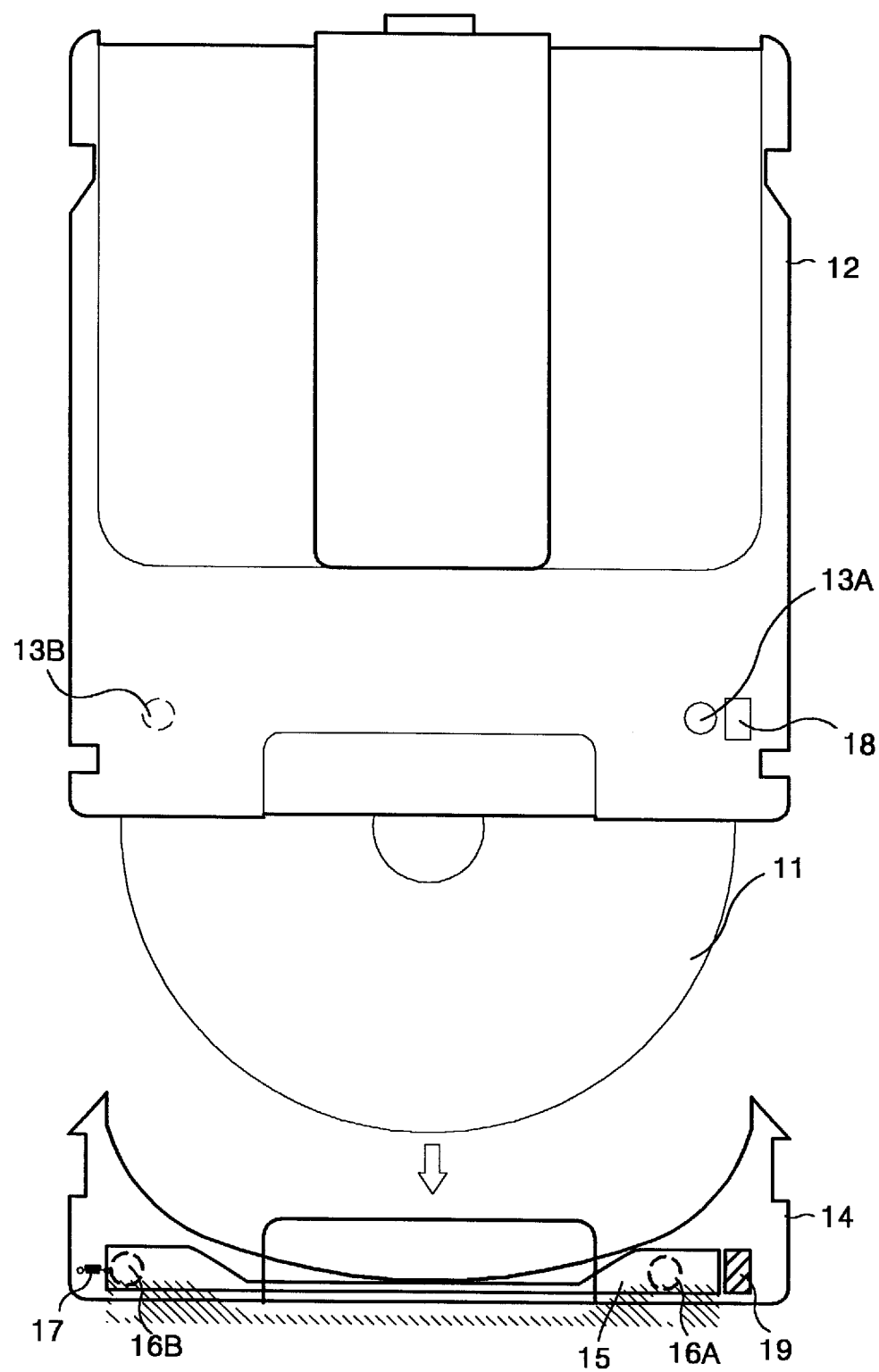
FIG. 2 is a plan view showing the structure of a disc cartridge according to a first embodiment of the present invention.

Referring to FIG. 2, there is shown a disc cartridge according to a first embodiment of the present invention. The disc cartridge includes a cartridge body in which two opened or closed experience confirming holes 13A and 13B and a tab hole 18 are formed, a holder 14 mounted to the cartridge body 12 insertably and releasably and functioning as an opening and closing member for the cartridge body, a slider 15 installed to the holder 14 and formed with slider holes 16A and 16B having a predetermined phase difference with respect to the opened or closed experience confirming holes 13A and 13B, a tab 19 for limiting a movement of the slider 15, and a spring 17 for driving the slider 15.

In the disc cartridge shown in FIG. 2, the cartridge body 12 is provided with an opening such that an optical pickup can access the disc 11. The opening is opened or closed by a movement of a shutter. An inserting hole is defined at the bottom side of the cartridge body 12. A holder 14 is insertably and releasably mounted in opposition to the inserting hole by a user. The double-sided disc 11 is received within the disc cartridge. Accordingly, each of the opened or closed experience confirming holes 13A and 13B is formed at the front and rear sides of the cartridge body 12 in such a manner to be assigned to each recording face of the double-sided disc 11. The opened or closed experience confirming holes 13A and 13B allow a disc driver to sense whether or not the loaded cartridge has an opened or closed experience, that is, whether or not the disc 11 has a release experience from the cartridge. In this case, a sensor for sensing an opening of the opened or closed experience confirming holes 13A and 13B is installed at one side of the disc driver in correspondence with a position of the opened or closed experience confirming holes 13A and 13B.

Figure 3A:
FIGS. 3a and 3b are plan views representing the opened or closed state of the opened or closed experience confirming holes shown in FIG. 2.
Figure 3B:
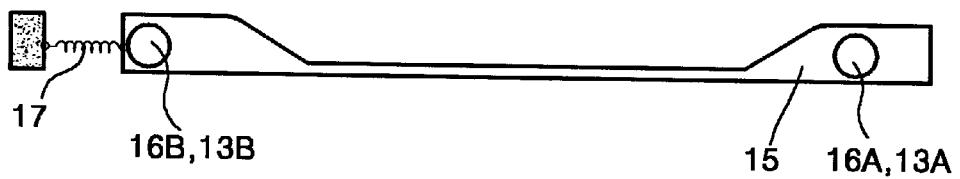

The slider 15 is mounted to the holder 14 in such a manner to be linearly driven with an elastic restoring force of the spring 17 functioning as a driving force provider. The tab 19 is installed adjacently to the right end of the slider 15 to keep a state fit in the tab hole 18 defined at the cartridge body 12 when the disc 11 does not have a released experience from the cartridge body 12, thereby restraining the holder 14 to the cartridge body 12 and limiting a linear driving of the slider 15. On the other hand, the tab 19 is removed by a user when the disc 11 is taken out from the cartridge, thereby allowing the holder 14 to be easily separated from the cartridge body 12 and allowing the slider 15 to be linearly driven. The spring 17 is connected to the inner wall of the holder 14 and to the left end of the slider 15 to apply an elastic restoring force to the slider 15 when the tab 19 is removed, thereby driving the slider 15. In other words, the spring 17 is pressed when.the slider 15 is restrained by the tab 19 and applies the elastic restoring force to the slider 15 when the tab 19 is removed by a user, thereby driving the slider 15. The slider holes 16A and 16B are defined in the slider 15 in such a manner to have a predetermined phase difference with respect to the opened or closed experience confirming holes 13A and 13B in the cartridge body 12 when the slider 15 is restrained by the tab 19. Accordingly, when the tab 19 is not removed as shown in FIG. 3a, the opened or closed experience confirming holes 13A and 13B keep a state shut off by the slider 15. On the other hand, when the tab 19 is removed as shown in FIG. 3b, the opened or closed experience confirming holes 13A and 13B keep an open state simultaneously because phases of the slider holes 16A and 16B are identical to those of the opened or closed experience confirming holes 13A and 13B by a driving of the slider 15.

More specifically, when a user takes out the disc 11 from the cartridge body 12 so as to use the disc in a bare state, he must remove the tab 19 and then separate the holder 16 from the cartridge body 12. Next, a user takes out the disc 11 through a receiving hole defined in the cartridge body 12. In this case, the slider 15 is moved to the right by an elastic restoring force of the spring 17 simultaneously with a removal of the tab 19. Subsequently, the slider 15 keeps a state driven linearly to the right when the disc 11 is again received within the cartridge body 12 and the holder 16 is mounted to the cartridge body 12 in such a manner that the slider holes 16A and 16B is opposed to the opened or closed experience confirming holes 13A and 13B, so that the opened or closed experience confirming holes are simultaneously opened. When the disc 11 has a release experience from the cartridge body 12 as described above, the opened or closed experience confirming holes 13A and 13B keep an open state. Thus, if a cartridge in which the opened or closed experience confirming holes 13A and 13B are opened is loaded, the disc driver senses the open state of the opened or closed experience confirming holes 13A and 13B by means of a sensor to judge that the disc 11 has a release experience. Further, if a release experience of the disc 11 is confirmed, then the disc driver precedes a retrieval operation of the disc 11 to assure an information responsibility of the disc 11.

Figure 4:
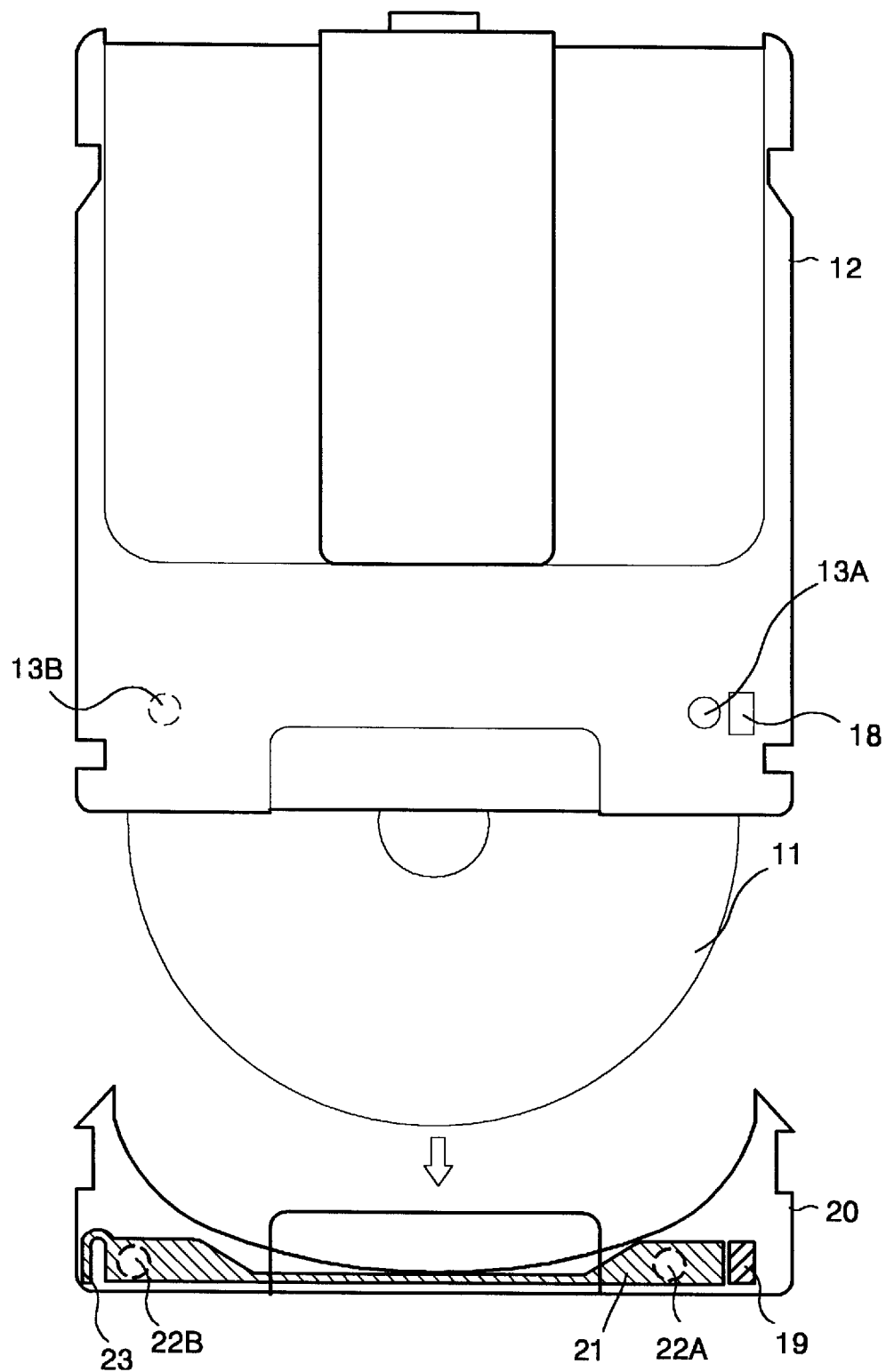
FIG. 4 is a plan view showing the structure of a disc cartridge according to a second embodiment of the present invention.

Referring now to FIG. 4, there is shown a disc cartridge according to a second embodiment of the present invention. The disc cartridge in FIG. 4 includes the same construction elements as the disc cartridge in FIG. 2 except that it has a mold spring 23 integral to the slider 21 instead of the spring 17 in the disc cartridge of FIG. 2. A detailed explanation as to the same construction elements will be omitted.

The disc cartridge shown in FIG. 4, opened or closed experience confirming holes 13A and 13B are symmetrically positioned at the front and rear lower ends of a cartridge body 12 in correspondence with a double-sided disc 11. The mold spring 23 is integral to the slider 21 to provide the slider 21 with a driving force. The mold spring 24 is extended in a bent shape at the left side of the slider 21 to generate an elastic force. The mold spring 23 and the slider holes 26A and 26B are together formed at the time of an injection molding of the slider 21. Accordingly, the spring and an additional connecting member as shown in FIG. 2 are not required, so that a configuration of the holder 20 is simplified and a manufacturing thereof becomes easy. In such a disc cartridge, the holder 20 is restrained to the cartridge body 11 by a tab 19 keeping a state fit in a tab hole 18 when the disc 11 does not have a release experience. Further, the slider 21 shuts off the opened or closed experience confirming holes 22A and 22B with a linear driving being restrained by the tab 19. On the other hand, since the tap 19 is removed by a user when the disc 11 has a release experience such that the slider 21 is linearly driven by an elastic restoring force of the mold spring 23, the opened or closed experience confirming holes 13A and 13B keep an open state by the opposed slider holes 22A and 22B. Accordingly, the disc driver senses a release experience of the disc 11 in accordance with whether or not the opened or closed experience confirming holes 13A and 13B defined at the loaded cartridge is opened, thereby judging whether or not a retrieval of the disc 11 was preceded.

Figure 5:
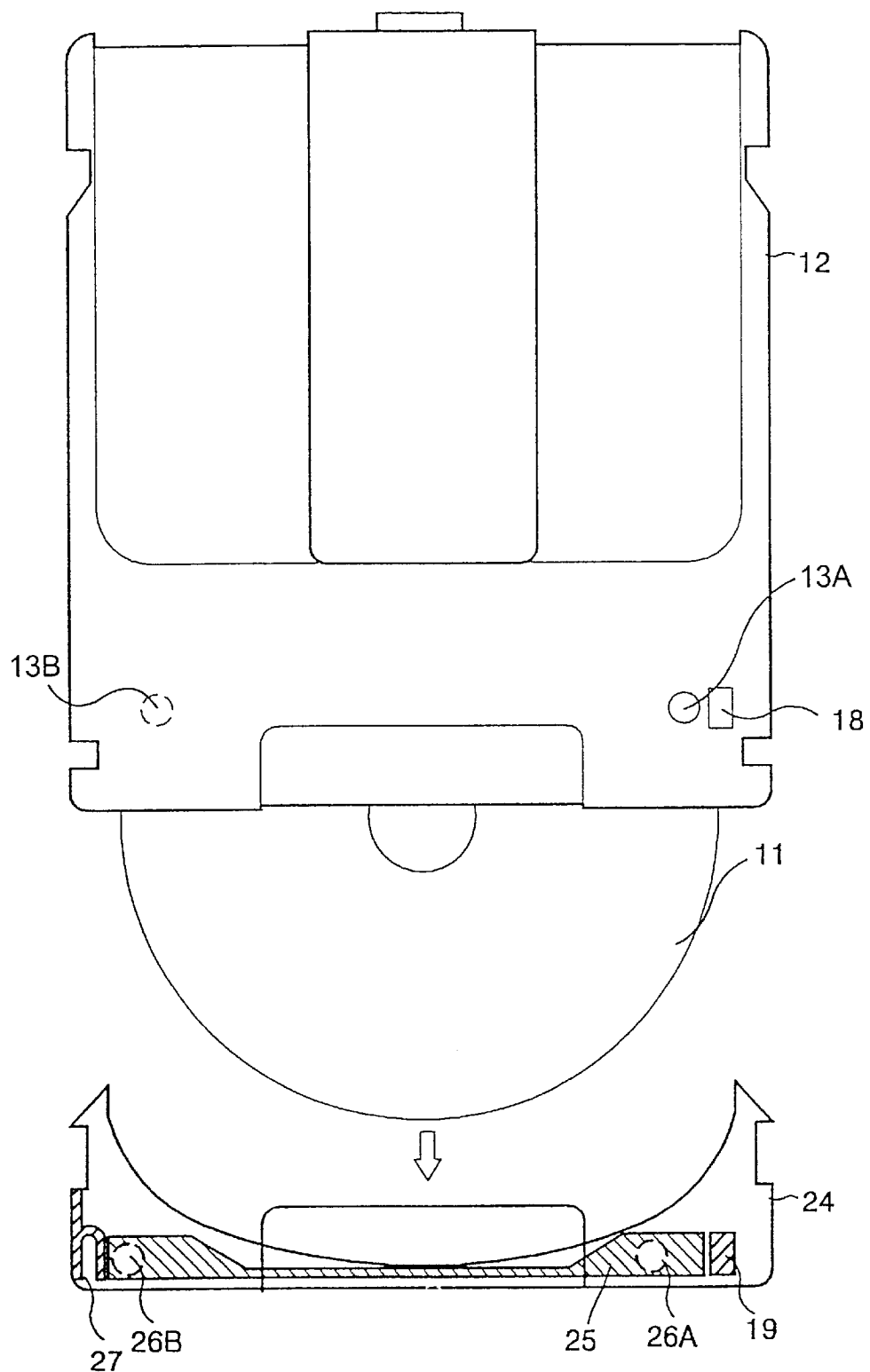
FIG. 5 is a plan view showing the structure of a disc cartridge according to a third embodiment of the present invention.

Referring now to FIG. 5, there is shown a disc cartridge according to a third embodiment of the present invention. The disc cartridge in FIG. 5 includes the same construction elements as the disc cartridge in FIG. 2 except that it has a mold spring 27 integral to the holder 24 instead of the spring 17 in the disc cartridge of FIG. 2. A detailed explanation as to the same construction elements will be omitted.

The disc cartridge shown in FIG. 5, opened or closed experience confirming holes 13A and 13B are symmetrically positioned at the front and rear lower ends of a cartridge body 12 in correspondence with a double-sided disc 11. The mold spring 27 is integral with the holder 24 to provide the slider 21 with a driving force. The mold spring 24 is extended in a bent shape at the inner side wall of the holder 24 to generate an elastic force. The mold spring 27 and the slider holes 26A and 26B are together formed at the time of an injection molding of the holder 24. Accordingly, the spring 17 and an additional connecting member as shown in FIG. 2 are not required, so that a configuration of the holder 24 is simplified and a manufacturing thereof becomes easy. In such a disc cartridge, the holder 24 is restrained to the cartridge body 12 by a tab 19 keeping a state fit in a tab hole 18 when the disc 11 does not have a release experience. Further, the slider 25 shuts off the opened or closed experience confirming holes 13A and 13B with a linear driving being restrained by the tab 19. On the other hand, since the tap 19 is removed by a user when the disc 11 has a release experience such that the slider 25 is linearly driven by an elastic restoring force of the mold spring 27, the opened or closed experience confirming holes 13A and 13B keep an open state by the opposed slider holes 26A and 26B. Accordingly, the disc driver senses a release experience of the disc 11 in accordance with whether or not the opened or closed experience confirming holes 13A and 13B defined at the loaded cartridge is opened, thereby judging whether or not a retrieval of the disc 11 was preceded.

By the way, FIG. 2 to FIG. 5 show only a case where elastic members 17, 23 and 27 for providing the sliders 15, 21 and 25 with a driving force are installed in opposition to the tab 19, but the same effect may well be achieved even when they are installed adjacently to the tab 19.

Meanwhile, a door-type opening or closing member having a structure in which a receiving hole is simply opened or closed, instead of the insertable and releasable holders 14, 20 and 24, is applicable to the disc cartridge according to the present invention. When the disc cartridge has such a door-type opening and closing member, the sliders 15, 21 and 25 and the elastic members 17, 23 and 27 may be installed at the cartridge body. In this case, an opening or closing of the door is allowed and a driving of the slider is limited and removed by making use of the above-mentioned tab 19. Also, the slider is driven with an elastic restoring force of the elastic member when the tab is removed, so that the two opened or closed experience confirming holes 13A and 13B can be simultaneously opened in the same manner as described above.

Figure 6:
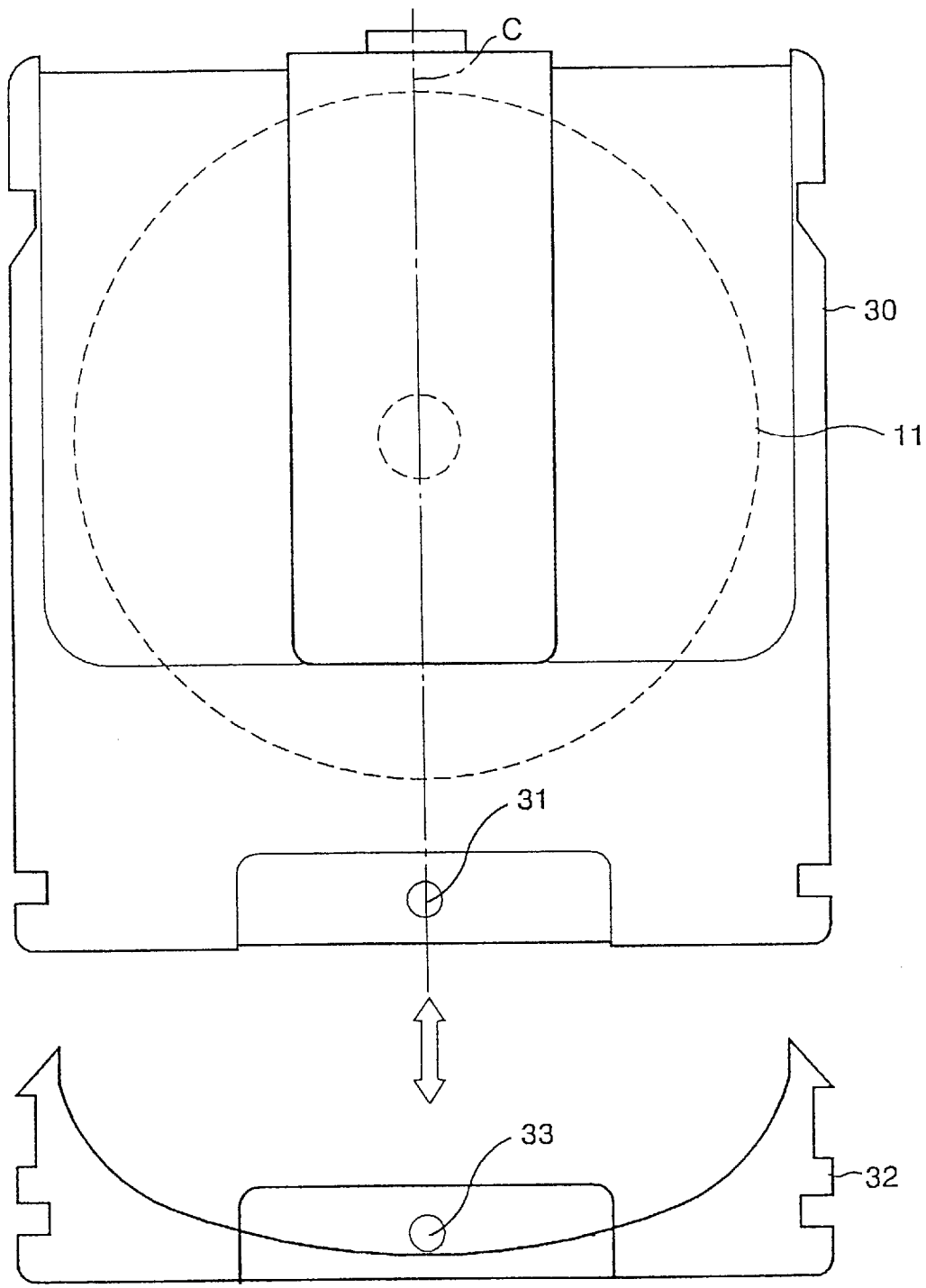
FIG. 6 is a plan view showing the structure of a disc cartridge according to a fourth embodiment of the present invention.

Referring to FIG. 6, there is shown a disc cartridge according to a fourth embodiment of the present invention. The disc cartridge includes a cartridge body 30 within which a disc 11 is received and at which one or two opposed opening or closing experience confirming holes 31 are formed along a longitudinal center line C of the body 30, and a holder 32 formed with a tapping hole 33 opposed to the opened or closed experience confirming holes 31.

In the disc cartridge shown in FIG. 6, a single-sided or double-sided disc 11 is received within the cartridge body 30. In one embodiment, if a single-sided disc is involved, one opened or closed experience confirming hole 31 may be formed at the lower center of the cartridge body 30 along the center line C. If the disc involved is a double-sided disc, two opened or closed experience confirming holes 31 are positioned along the center line C in opposition to the front and rear sides of the cartridge body 30, respectively, in such a manner to be corresponded to each recording face. Each opened or closed experience confirming hole 31 allows the disc driver to sense whether or not the loaded cartridge has an opened or closed experience, that is, whether or not the disc 11 has a release experience from the cartridge. The holder 32 is insertably and releasably mounted to the cartridge body 30. The tapping hole 33 is positioned in opposition to the opened or closed experience confirming hole 31 when the holder 32 has been mounted to the cartridge body 30. In such a disc cartridge, when the disc 11 does not have a release experience, that is, when the holder 32 does not have an experience separated from the cartridge body 30, the opened or closed experience confirming hole 31 and the tapping hole 33 are shut off by means of a tab 34 as shown in FIG. 7.

Figure 7:
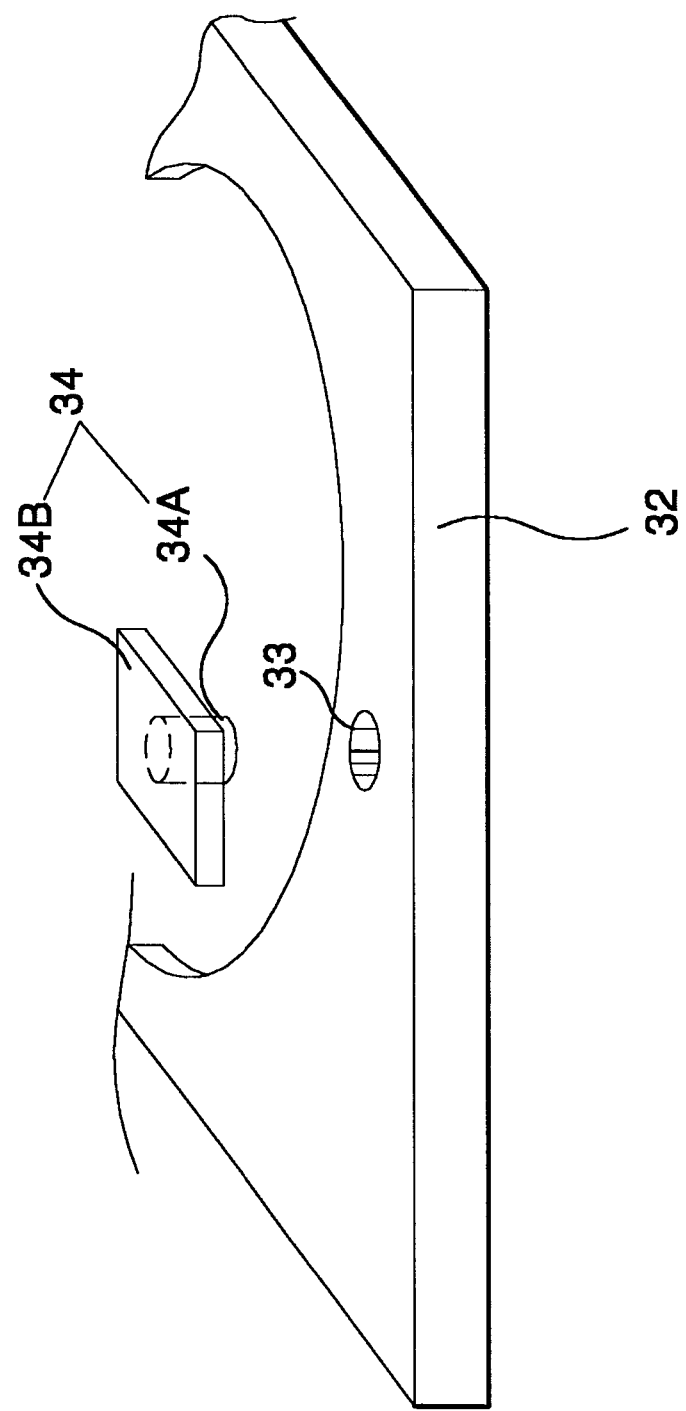
FIG. 7 is a perspective view representing a coupled relationship between the tapping hole and the tab member in the holder shown in FIG. 6.
Figure 8:
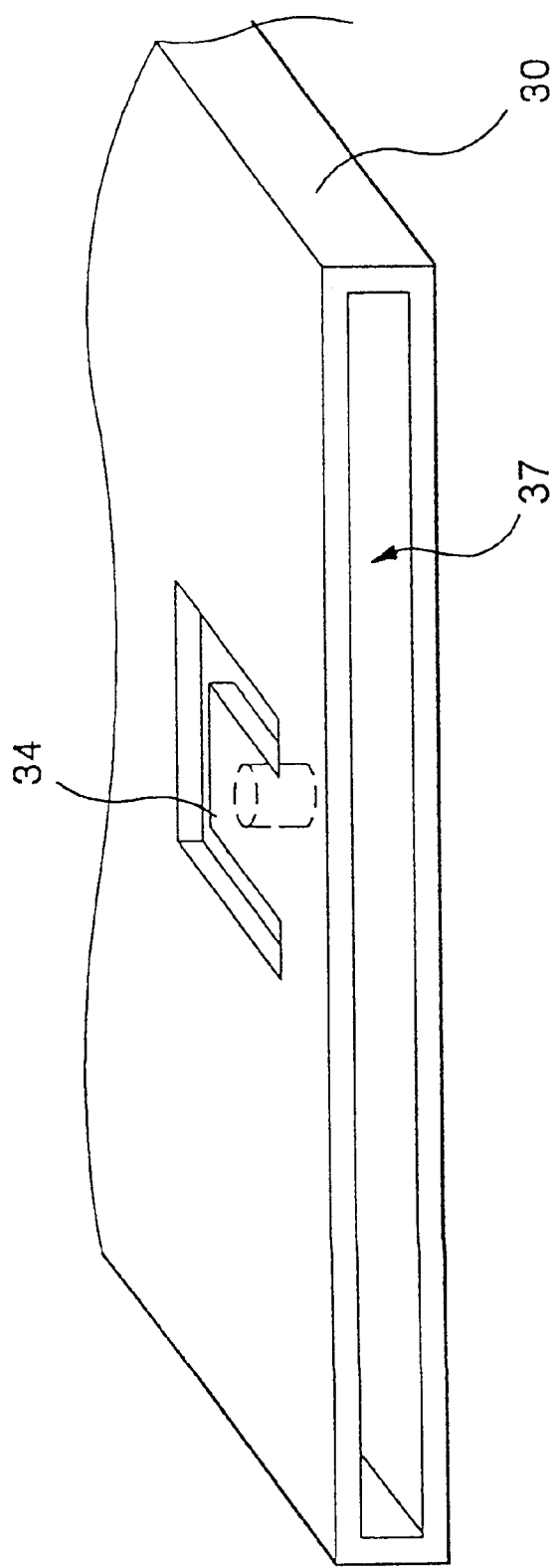
FIG. 8 is a partial perspective view representing the cartridge body mounted with the tab member shown in FIG. 7.

In FIG. 7, the tab 34 includes a head 34B, and a neck 34A extended vertically from the head 34B to be fit in the tapping hole 33. As shown in FIG. 8, in one embodiment, the tab 34 is together formed in a shape integral to the cartridge body 30 at the time of an injection molding of the cartridge body 30. The tab 34 keeps a state fit in the tapping hole 33 when the disc 11 dose not have a release experience, thereby restraining the holder 32 to the cartridge body 30. On the other hand, when it is intended to separate the holder 32 so as to take out the disc 11, the tab 34 is removed by a user to thereby separate the holder 32 from the cartridge body 30 easily. The tab 34 has been removed by a user when the holder 32 has a separated experience, that is, when the disc 11 has a released experience as described above, so that the opened or closed experience confirming hole 31 keeps an open state along with the tapping hole 33. If a cartridge in which the opened or closed experience confirming holes 31 are opened is loaded through a receiver 37 provided in the cartridge body 30, the disc driver senses the open state of the opened or closed experience confirming holes 31 by means of a sensor to judge that the disc 11 has a release experience. If a release experience of the disc 11 is confirmed in this manner, then the disc driver precedes a retrieval operation of the disc 11 to assure an information responsibility of the disc 11.

Figure 9:
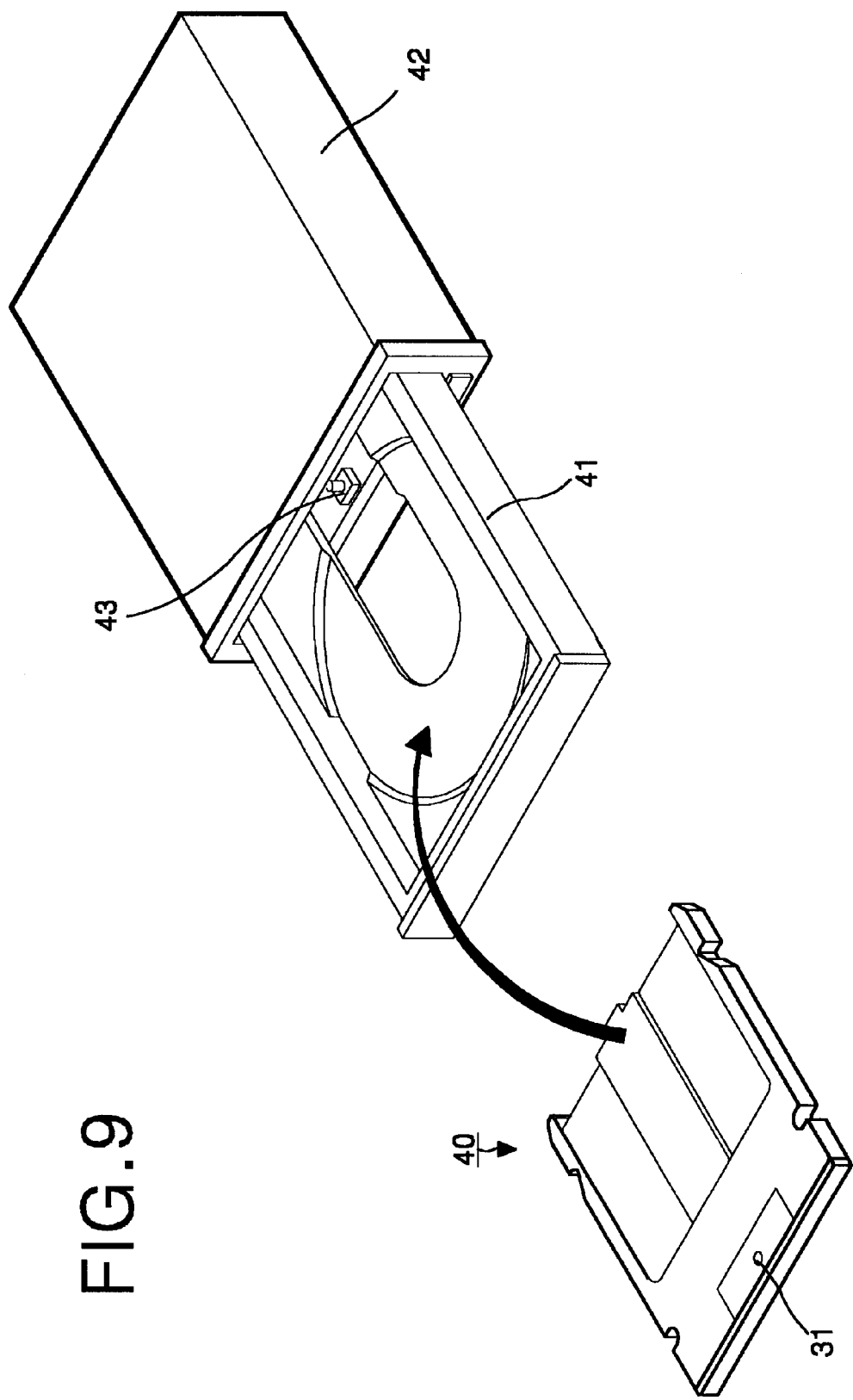
FIG. 9 is a perspective view of a disc driver loaded with the disc cartridge shown in FIG. 6.

In this case, a sensor 43 for sensing the opened or closed experience confirming hole(s) 31 defined at the front center of the disc cartridge as shown in FIG. 9 is installed at the front center of a disc driver 42 as shown in FIG. 9. In FIG. 9, the disc cartridge 40 is carried on a tray 41 mounted to the disc driver 42 to be loaded into the disc driver 42. The disc driver 42 senses whether the opened or closed experience confirming hole 31 is opened or closed by means of the sensor 43 installed at the front center thereof when the disc cartridge 40 is loaded, thereby judging whether or not a verification has been preceded.

Figure 1:
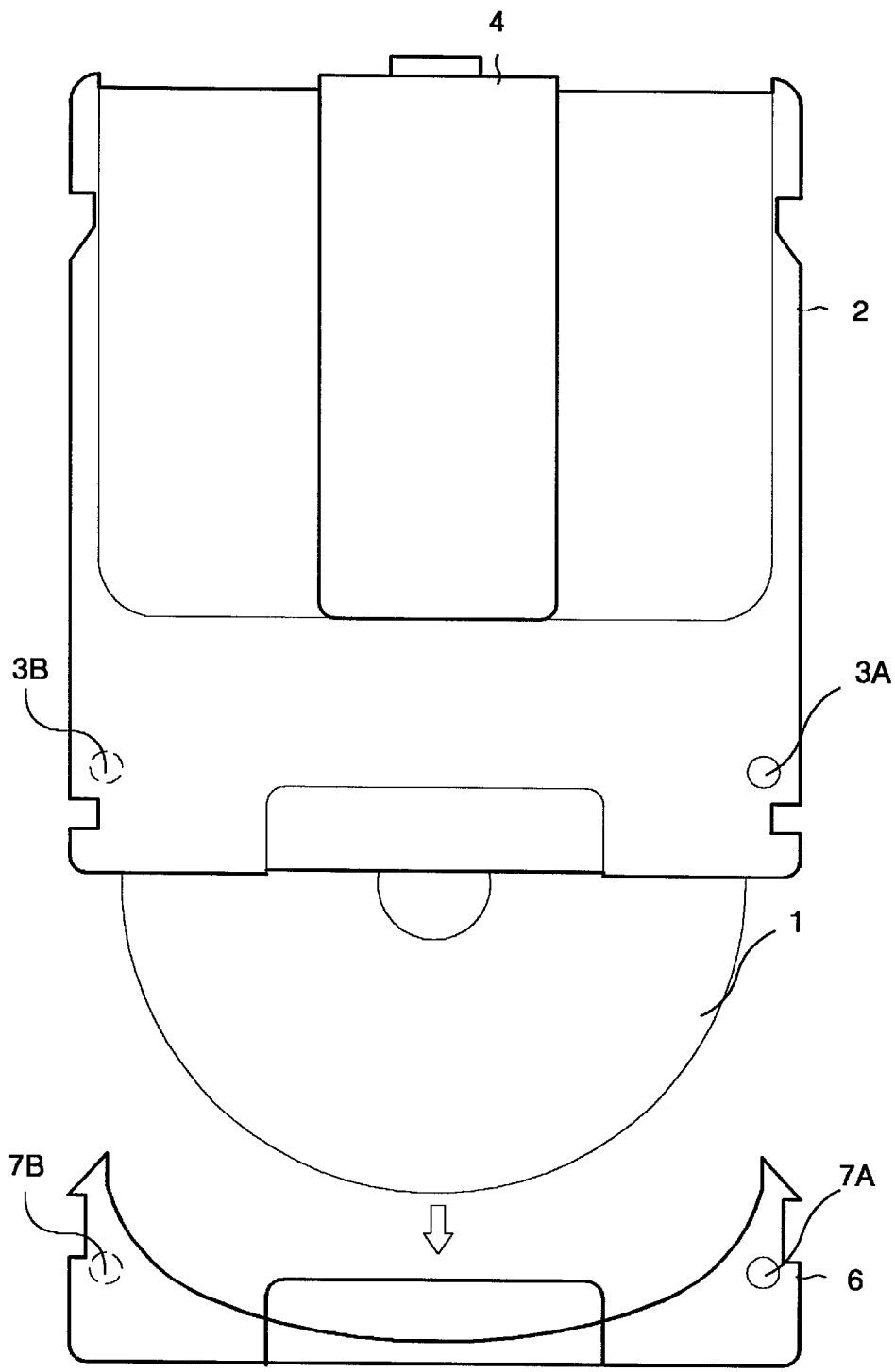
FIG. 1 is a plan view showing the structure of the conventional open-close type disc cartridge.

The disc cartridge according to the present invention shown in FIG. 6 will be explained in comparison to the conventional disc cartridge shown in FIG. 1 below. The conventional disc cartridge shown in FIG. 1 includes opened or closed experience confirming holes 3A and 3B defined at each of the front and rear sides of the cartridge body 2 in correspondence with the double-sided disc 1. In this case, since each of tapping holes 7A and 7B formed at the tab and the holder for shutting off each of the opened or closed experience confirming holes 3A and 3B is formed by two, it has an inconvenience in that each of them must be removed when removing the tab. In contrast, the disc cartridge according to the present invention as shown in FIG. 6 includes the opened or closed experience confirming holes 31 formed in opposition to the front and rear centers of the cartridge body 30 in correspondence with the double-sided disc 11. In this case, the opened or closed experience confirming holes 31 are shut off by a single tab 34, and the opened or closed experience confirming holes 31 at the front and rear sides can be simultaneously opened through the tapping hole 33 defined at the center of the holder 32 when the tab 34 is removed. As a result, the disc cartridge according to the present invention can adjust an opened or closed state of the opened or closed experience confirming holes 31 at once by removing a single tab 34, so that an adjustment thereof is simplified.

As described above, the disc cartridge according to the present invention can simultaneously adjust the opened or closed state of the two opened or closed experience confirming holes corresponding to the double-sided disc by making use of a linear-driving member, i.e., a slider. Also, in the disc cartridge according to the present invention, the opened or closed experience confirming holes corresponding to the double-sided disc are formed in opposition to the lower side center of the cartridge, so that the opened or closed state of the opened or closed experience confirming holes can be simultaneously adjusted by a removal of a single tab. Accordingly, since the disc cartridge according to the present invention can take out a disc from the cartridge by the removal of a single tab only, it is capable of improving a user's convenience. Furthermore, the disc cartridge according to the present invention can sense the opened or closed state of the opened or closed experience confirming holes by making use of a single sensor installed to one side or the center of the disc driver.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A disc cartridge that is capable of protecting at least one of a one-sided disc and a double-sided disc, comprising:

a cartridge body for receiving the disc and in which at least one of opened or closed experience confirming holes for indicating whether or not the cartridge has an opened or closed experience is formed; and opening and closing means for allowing a confirmation of an opened or closed state of the cartridge with respect to each face of the disc only by an opening or closing of any one of the opened or closed confirming holes, wherein said opening and closing means is a member completely detached from the cartridge body.

2. The disc cartridge as claimed in claim 1, wherein said at least one of opened or closed experience confirming holes are at least two in number, and the opened or closed experience confirming holes are simultaneously opened or closed by one operation of the opening and closing means.

3. The disc cartridge as claimed in claim 2, wherein said opening and closing means includes a sliding member for simultaneously closing or opening the confirming holes by one sliding action of the sliding member.

4. The disc cartridge as claimed in claim 3, wherein said opening and closing means further includes a single tab for controlling the sliding action of the sliding member.

5. A disc driving apparatus, comprising:

a tray to receive a disc cartridge therein, the disc cartridge including a cartridge body for receiving a disc and in which at least one of opened or closed experience confirming holes for indicating whether or not the cartridge has an opened or closed experience is formed, and opening and closing means for allowing a confirmation of an opened or closed state of the cartridge only by an opening or closing of any one of the opened or closed confirming holes, wherein said opening and closing means is a member completely detached from the cartridge body; and a sensing member, being installed in correspondence with positions of the opened or closed experience confirming holes, to sense whether the opened or closed experience confirming hole has been opened or closed.

6. A disc cartridge that is capable of protecting a disc, comprising:

a cartridge body in which a plurality of opened or closed experience confirming holes for indicating whether or not the cartridge has an opened or closed experience is formed; and a sliding member, being provided with a plurality of holes having a predetermined phase difference with respect to the opened or closed experience confirming holes, for opening or closing the opened or closed experience confirming holes simultaneously by a single sliding action of the sliding member.

7. The disc cartridge as claimed in claim 6, further comprising:

an opening and closing member for opening or closing a disc receiver formed at the body.

8. The disc cartridge as claimed in claim 7, wherein said opening and closing member is a holder member mounted insertably and releasably to the cartridge body.

9. The disc cartridge as claimed in claim 8, further comprising:

a tab member for restraining a linear driving of the sliding member and for allowing the holder member to be restrained to the cartridge body; and a driving force provider for providing the sliding member with a driving force.

10. The disc cartridge as claimed in claim 9, wherein said sliding member is linearly driven such that phases of the holes of said sliding member coincide with the opened or closed experience confirming holes by the driving force when the tab member is removed.

11. The disc cartridge as claimed in claim 9, wherein said driving force provider is an elastic member for providing the sliding member with an elastic restoring force.

12. The disc cartridge as claimed in claim 11, wherein said elastic member is a spring connected between the holder member and the sliding member.

13. A disc cartridge that is capable of protecting a double-sided disc, comprising:

a cartridge body in which a plurality of opened or closed experience confirming holes for indicating whether or not the cartridge has an opened or closed experience is formed;

a sliding member, being provided with a plurality of holes having a predetermined phase difference with respect to the opened or closed experience confirming holes, for opening or closing the opened or closed experience confirming holes simultaneously;

a holder member mounted insertably and releasably to the cartridge body;

a tab member for restraining a linear driving of the sliding member and for allowing the holder member to be restrained to the cartridge body; and a driving force provider for providing the sliding member with a driving force.

14. The disc cartridge as claimed in claim 13, wherein said sliding member is linearly driven such that phases of the holes of said sliding member become identical to those of the opened or closed experience confirming holes by the driving force when the tab member is removed.

15. The disc cartridge as claimed in claim 13, wherein said driving force provider is an elastic member for providing the sliding member with an elastic restoring force.

16. The disc cartridge as claimed in claim 15, wherein said elastic member is a spring connected between the holder member and the sliding member.

* * * * *